(12) United States Patent
Richardson (10) Patent No.: US 9,310,787 B2
(45) Date of Patent: Apr. 12, 2016

(54) APPARATUS, SYSTEMS, AND METHODS FOR CONFIGURING DEVICES REMOTE CONTROL COMMANDS

(71) Applicant: EchoStar Technologies L.L.C., Englewood, CO (US)

(72) Inventor: Jon Richardson, Chamblee, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 512 days.

(21) Appl. No.: 13/725,928

(22) Filed: Dec. 21, 2012

(65) Prior Publication Data

US 2014/0176313 A1 Jun. 26, 2014

(51) Int. Cl.
| | | |
|---|---|---|
| G08B 21/00 | (2006.01) | |
| G05B 15/02 | (2006.01) | |
| G08C 17/00 | (2006.01) | |
| G08C 19/28 | (2006.01) | |

(52) U.S. Cl.
CPC ................ G05B 15/02 (2013.01); G08C 17/00 (2013.01); G08C 19/28 (2013.01); *G08C 2201/20* (2013.01); *G08C 2201/92* (2013.01)

(58) Field of Classification Search
CPC .................................................... G08C 2201/92
See application file for complete search history.

(56) References Cited

U.S. PATENT DOCUMENTS

| | | | |
|---|---|---|---|
| 8,095,814 B2 | 1/2012 | O'Connell et al. | |
| 8,310,603 B2 | 11/2012 | Asayama et al. | |
| 8,347,128 B2 | 1/2013 | Suzuki et al. | |
| 8,443,217 B2 | 5/2013 | Higuchi | |
| 8,447,999 B2 | 5/2013 | Sato | |
| 8,954,768 B2 | 2/2015 | Dickens et al. | |
| 2003/0149492 A1 | 8/2003 | Munezane | |
| 2004/0032605 A1 | 2/2004 | Regimbal | |
| 2004/0125080 A1* | 7/2004 | Ha et al. ........................ | 345/156 |
| 2006/0010331 A1 | 1/2006 | Ohara | |

(Continued)

FOREIGN PATENT DOCUMENTS

| | | |
|---|---|---|
| EP | 1376938 A1 | 1/2004 |
| JP | 2009016897 A | 1/2009 |
| WO | 2008/056708 A1 | 5/2008 |

OTHER PUBLICATIONS

Youn-Kwae Jeong et al., "A Network Level Power Management for Home Network Devices", IEEE Transactions on Consumer Electronics, IEEE Service Center, New York, NY, US, vol. 54, No. 2, May 1, 2008, pp. 487-493, XP011229924, ISSN: 0098-3063, DOI: 10.1109/TCE.2008.4560119.

(Continued)

*Primary Examiner* — Mark Rushing
(74) *Attorney, Agent, or Firm* — Seed IP Law Group PLLC (57) ABSTRACT

A particular device may configure one or more of other devices to accept and execute remote control commands from the particular device's remote control unit. This may be performed via one or more various communication links between the devices on that enables the devices to communicate with each other. For example, the remote control of a set-top box can be used to control both the set-top box and a television without a user having to specially program the set-top box or other universal remote control. One example of a communication link between the devices that enables the devices to communicate with each other is a device-to-device messaging protocol such as that provided by the High Definition Multimedia Interface (HDMI) standard.

14 Claims, 7 Drawing Sheets

(56) References Cited

U.S. PATENT DOCUMENTS

| | | | |
|---|---|---|---|
| 2006/0152401 A1* | 7/2006 | Spilo | 341/176 |
| 2006/0259926 A1 | 11/2006 | Scheelke et al. | |
| 2008/0270814 A1 | 10/2008 | Starr et al. | |
| 2008/0271074 A1 | 10/2008 | Bae et al. | |
| 2009/0046205 A1 | 2/2009 | Strasser et al. | |
| 2009/0083825 A1 | 3/2009 | Miller et al. | |
| 2010/0033026 A1 | 2/2010 | Goto et al. | |
| 2010/0215375 A1* | 8/2010 | Reams | 398/107 |
| 2010/0269137 A1 | 10/2010 | Nakajima et al. | |
| 2011/0050478 A1* | 3/2011 | Choi et al. | 341/176 |
| 2011/0107369 A1 | 5/2011 | O'Brien et al. | |
| 2012/0041925 A1 | 2/2012 | Pope et al. | |
| 2012/0086563 A1* | 4/2012 | Arling et al. | 340/12.52 |

OTHER PUBLICATIONS

International Search Report for PCT/US2012/068218, mailed Mar. 19, 2013, 4 pages.

International Preliminary Report on Patentability for PCT/US2012/068218, issued Jun. 17, 2014, 7 pages.

Richardson, "Systems and Methods for On-Screen Display of Content Information," U.S. Appl. No. 13/112,841, filed May 20, 2011, 23 pages.

Richardson, "Apparatus, Systems and Methods for Modifying Operating States Based on Monitored HDMI CEC Communications," U.S Appl. No. 13/707,191, filed Dec. 6, 2012, 37 pages.

* cited by examiner

APPARATUS, SYSTEMS, AND METHODS FOR CONFIGURING DEVICES REMOTE CONTROL COMMANDS

BRIEF SUMMARY

Apparatus, systems, and methods are disclosed for any particular device to configure one or more of other devices to accept and execute remote control commands from the particular device's remote control unit. This may be performed via one or more various communication links between the devices on the customer premises that enables the devices to communicate with each other.

For example, the remote control of a set-top box can be used to control both the set-top box and the television without a user having to specially program the set-top box, television or other universal remote control. One example of a communication link between the devices that enables the devices to communicate with each other is a device-to-device messaging protocol such as that provided by the High Definition Multimedia Interface (HDMI) standard.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
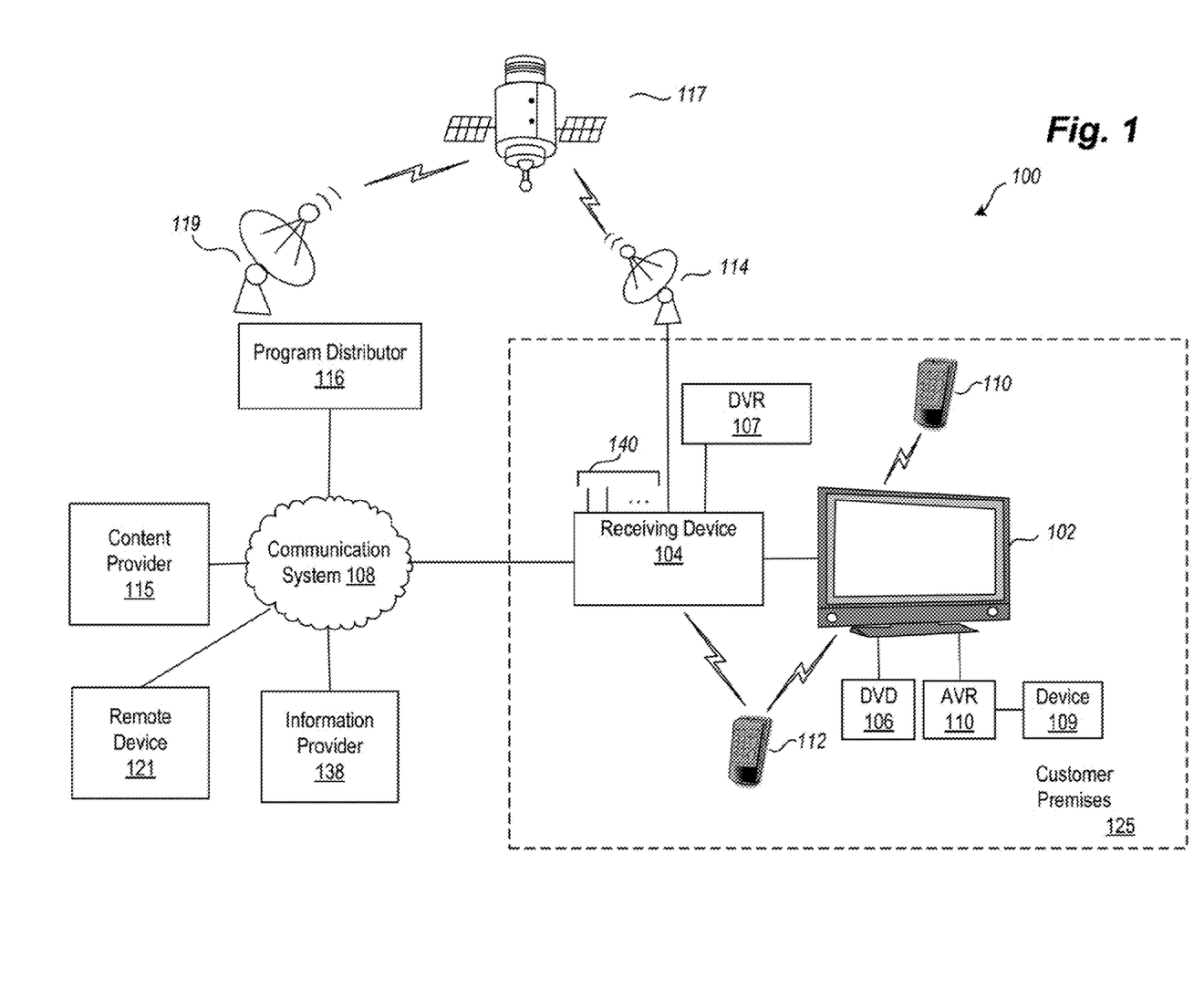
FIG. 1 is an overview block diagram illustrating an example content distribution environment 100 in which embodiments of a system for configuring devices to accept remote control commands may be implemented.

FIG. 1 is an overview block diagram illustrating an example communication environment 100 in which embodiments of a system for configuring devices to accept remote control commands may be implemented.

In this example embodiment, any particular device on the customer premises 125 can configure one or more of the other devices on the customer premises 125 to accept remote control commands from the particular device's remote control unit. This may be performed via one or more various communication links between the devices on the customer premises 125 that enables the devices to communicate with each other.

For example, receiving device 104 can configure the display 102 to accept and execute commands from the receiving device remote control 112. In this way, the one remote control (e.g., the receiving device remote control 112) can be used to control both the receiving device 104 and the display 102 without a user having to specially program the receiving device remote control 112 or other universal remote control. One example of a communication link between the devices on the customer premises 125 that enables the devices to communicate with each other is a device-to-device messaging protocol such as that provided by the High Definition Multimedia Interface (HDMI) standard. For example, remote control command information such as, but not limited to, remote control command interpretation, translation and/or mapping information enabling the display to accept and execute commands from the receiving device remote control 112 may be communicated from the receiving device 104 to the display 102 over a device communication connection. As used herein, a device communication connection or device communication bus refers respectively to any communication, command and/or control connection or bus (either physical or logical) between electronic devices that enables or facilitates the connected electronic devices to have device-to-device communication with each other via the device communication connection or bus. There are specific types of device communication connections, such as an HDMI Consumer Electronics Control (CEC), (also interchangeably referred to herein as "CEC") connection described in more detail below and that is defined in the HDMI specification or standard (i.e., the current publicly available and any applicable future publicly available versions of the HDMI specification). In some alternative embodiments, the receiving device remote control 112 may also or instead communicate such information to the display 102 to configure the display to accept and execute commands from the receiving device remote control 112.

In some embodiments, if a device on the customer premises 125 is connected to an external communication system 108, a remote device 121 (e.g., a smart phone or other computing device) which is also connected to the communication system 108 may communicate information to the receiving device 104 (and/or the other devices on customer premises 125 via the receiving device 104) to configure the receiving device 104 and/or the other devices to accept and execute remote control commands from the remote device 121 or from other remote control devices of other devices.

Before providing additional details regarding the operation and constitution of the system for configuring devices to accept remote control commands, the communication environment 100 within which the system for configuring devices to accept remote control commands may be implemented will briefly be described. In the communication environment 100, audio, video, and/or data service providers, such as, but not limited to, television service providers, provide their customers a multitude of audio/video and/or data programming (hereafter, collectively and/or exclusively "programming"). Such programming is often provided by use of a receiving device 104 communicatively coupled to a display 102 configured to receive the programming.

The receiving device 104 interconnects to one or more communications media or sources (such as a cable head-end, satellite antenna, telephone company switch, Ethernet portal, off-air antenna, or the like) that provide the programming. The receiving device 104 commonly receives a plurality of programming by way of the communications media or sources described in greater detail below. Based upon selection by a user, the receiving device 104 processes and communicates the selected programming to the display 102.

For convenience, the receiving device 104 may be, but is not limited to, a "television converter," "receiver," "set-top box (STB)," "television receiving device," "television receiver," "television recording device," "satellite set-top box," "satellite receiver," "cable set-top box," "cable receiver," "media player," "digital video recorder (DVR)," "audio/visual receiver (AVR)," and/or "television tuner," etc. Accordingly, the receiving device 104 may be any suitable converter device or electronic equipment that is operable to receive programming. Further, the receiving device 104 may itself include user interface devices, such as buttons or switches. In many applications, a remote-control device or component ("remote") 112 is operable to control the receiving device 104. The remote 112 typically communicates with the receiving device 104 using a suitable wireless medium, such as infrared ("IR"), radio frequency ("RF"), or the like and may be capable of one way and/or two-way communication.

Examples of a display 102 include, but are not limited to, a television ("TV"), a personal computer ("PC"), a sound system receiver, a digital video recorder ("DVR"), a compact disk ("CD") device, game system, or the like. Display 120 may employ a display screen, one or more speakers, and/or other output devices to communicate video and/or audio content to a user. In many implementations, one or more display devices 102 reside in or near a customer's premises 125 and are communicatively coupled to the receiving device 104. Further, the receiving device 104 and the display 102 may be integrated into a single device. Such a single device may have the above-described functionality of the receiving device 104 and the display 102, or may even have additional functionality.

A content provider 115 provides program content, such as television content or audio content, to a distributor, such as the program distributor 116. Example content providers include television stations which provide local or national television programming, special content providers which provide premium based programming or pay-per-view programming, or radio stations which provide audio programming.

Program content, interchangeably referred to as a program, is communicated to the program distributor 116 from the content provider 115 through suitable communication media, generally illustrated as communication system 108 for convenience. Communication system 108 may include one or more of many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, packet switched networks, and satellite systems.

In at least one embodiment, the received program content is converted by the program distributor 116 into a suitable signal (a "program signal") that is communicated (i.e., "uplinked") by antenna 119 to satellite 117 (separately illustrated herein from, although considered part of, the communication system 108). The communicated uplink signal may contain a plurality of multiplexed (e.g., time division multiplexed) programs that are organized into distinct logical or physical channels. The uplink signal is received by the satellite 117 and then communicated (i.e., "downlinked") from the satellite 117 in one or more directions, for example, onto a predefined portion of the planet.

A receiver antenna 114 that is within reception range of the downlink signal communicated from satellite 117 receives the above-described downlink signal. Some types of receiver antenna 114 are operable to receive signals from a single satellite 117. Other types of receiver antenna 114 are operable to receive signals from multiple satellites 117 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 104 is operable to receive signals from multiple, distinct antennas.

The receiver antenna 114 can be located at customer premises 125. Examples of customer premises 125 include a residence, a business, or any other suitable location operable to receive signals from satellite 117. The received signal is communicated, typically over a hard-wire connection, to a receiving device 104. The receiving device 104 converts the received signal from antenna 114 into a signal and/or format suitable for communication to a display 102 or another device, such as a digital video recorder or a home computing system. In some embodiments, the receiver antenna 114 may be remotely located from the customer premises 125. For example, the antenna 114 may be located on the roof of an apartment building, such that the received signals may be transmitted, after possible recoding, via cable or other mechanisms, such as Wi-Fi, to the customer premises 125.

The receiving device 104 may receive programming partially from, or entirely from, another source other than the above-described receiver antenna 114. Other embodiments of the receiving device 104 may receive data from program distributors 106 and/or content providers 104 via locally broadcast RF signals, cable, fiber optic, Internet media, or the like.

In addition, information provider 138 may provide various forms of content and/or services to various devices residing in the customer premises 125. For example, information provider 138 may provide a Web page (or other information) to the receiving device 104 or other computing device. Information provider 138 may further perform or facilitate electronic commerce transactions.

In one example embodiment, a typical system on customer premises 125 may include a set of interconnected entertainment devices (or simply "devices"), such as the display 102, the receiving device 104, a digital video disc (DVD) player 106, an audio/visual receiver (AVR) 110, digital video recorder (DVR) 107, and one or more other electronic devices represented by device 109. Device 109 may be another device such as the receiving device 104, display 102, DVD 106, DVR 107, AVR 110, and/or be another device such a computer, smart phone, tablet device, mobile computing device, media player, remote control, other computing or entertainment device, etc.

As shown, display 102 may be communicatively coupled to the other devices directly (e.g., receiving device 104, DVD 106, and AVR 110) or indirectly through other devices (such as DVR 107 and device 109), such as, for example, via an HDMI CEO connection, or other device communication bus or network connection. In addition, each device may have additional input sources and/or other network connections, such as source inputs 140 of receiving device 104, described in further detail below.

One or more of the devices shown in FIG. 1 may be controllable through some type of remote control component. In the illustrated embodiment, for example, display 102 may be controlled via remote control component 110, and receiving device 104 may be controlled via remote control component 112.

In addition, one or more of the devices shown in FIG. 1 will generally be capable of interacting with display 102 to produce an on-screen display of information relating to that device. For example, receiving device 104 may be configured to receive a command from remote control component 112 and subsequently instruct display 102 to display information, such as electronic program guide (EPG) information or other selectable list of content available (not shown) via receiving device 104. Through appropriate interaction with remote control component 112 (e.g., through the use of buttons, sliders, touch-screen regions, and the like), the user may scroll through, select, highlight, modify, and otherwise interact with the information presented on display 102. Similarly, display 102 may itself be configured to produce and display information relating to operation of display 102.

Figure 2:
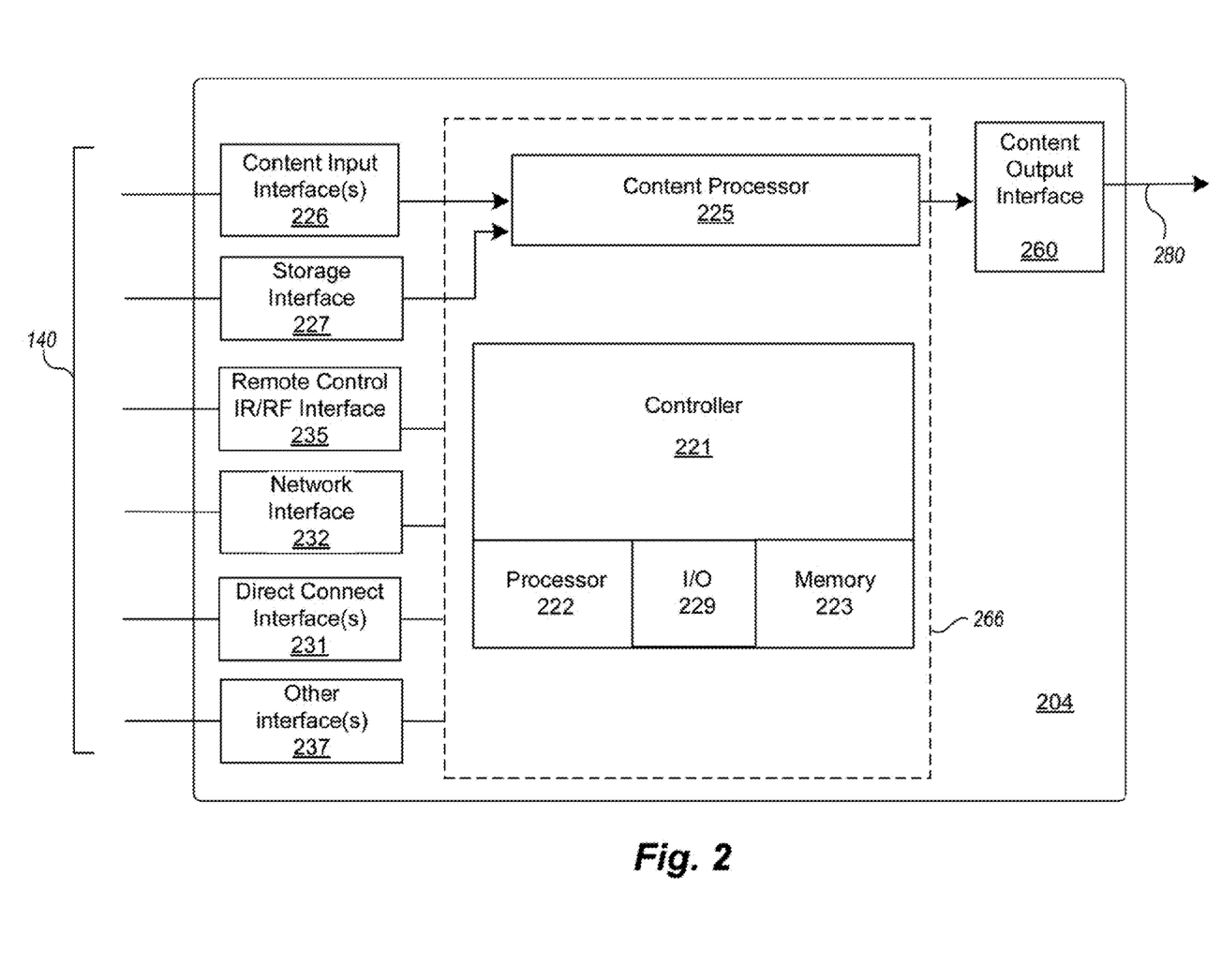
FIG. 2 is a block diagram of an example embodiment of a device used in the system for configuring devices to accept and process remote control commands.

Referring to FIG. 2 in conjunction with FIG. 1, shown is an example device control system 204 (which may be incorporated into any device shown in FIG. 1, such as receiving device 104) configured to receive, decode, render and output content (e.g., render audio and/or programming for output, such as for presentation to display 102) based on any number of source inputs 140. In various embodiments, one or more source inputs 140 correspond to broadcasts received over a conventional distribution channel such as a terrestrial broadcast system, a cable television system, a direct broadcast satellite (DBS) system (e.g., from satellite 119) or the like. In other embodiments, source inputs 140 may be coupled to the Internet or another digital network, which may be part of or connected to communications system 108, using any sort of file-based, stream-based, on-demand or other distribution technique.

Device control system 204 comprises any combination of system, device and/or other components that include appropriate hardware, software, firmware and/or other processing logic to implement the various functions related to communication with other devices; receiving, processing and executing remote control commands; and receiving and presenting information (e.g., programming) to a user. In one embodiment, device control system 204 may include a television receiver, for example, such as that in any type of set top box (receiving device) or similar system that receives programming content from a terrestrial broadcast, cable or satellite distributor (e.g., via satellite 117) for presentation on a television or other display 102. In various embodiments, control system 204 may receive and process content, programming and commands received from one or more of network, stored media, broadcast, HDMI CEO connections, any type of video and/or audio connections and/or other sources as applicable.

In the example shown in FIG. 2, device control system 204 suitably includes a controller 221 that interacts with various interfaces including, but not limited to, a content input interface 226, a storage interface 227 to a DVR (such as DVR 107), other storage device or the like; a remote control infrared and/or radio frequency (IR/RF) Interface 235; a network interface 232; one or more direct connect interface(s) 231; other interfaces (e.g., to various external and/or internal devices providing data, signals, commands and/or content); and a content output interface 260 (e.g., to display 102 and/or an audio output device). Various equivalent embodiments of device control system 204 may be implemented within any additional or alternate components or products or arrangements that may differ from those shown in FIG. 2.

Controller 221 suitably includes any combination of microprocessors, microcontrollers, digital signal processors or other programmable hardware capable of directing the actions and functions of device control system 204. Controller 221 typically obtains programming content received via content input interface 226 and renders the video, audio and/or supplemental content contained within a demodulated transport stream for output at output interface 260 and presentation on an integrated output device and/or external presentation device such as display 102. To that end, controller 221 identifies and extracts relevant elementary streams within the received transport stream, and generates an appropriate output signal 280 to present video and/or audio content on display 102. Controller 221 may further direct the storage or retrieval of programming content on DVR 107 or the like. Controller 221 also directs, interprets and processes and/or stores communications, commands and data received via Remote Control IR/RF Receiver 231, network interface 232 and CEC interface 235 as applicable. For example, Controller 221 executes remote control commands received via Remote Control IR/RF Receiver 231 and via the CEC interface 235. Some embodiments include multiple separate controllers to perform these operations and/or multiple controllers of which Controller 221 is comprised.

In various embodiments, controller 221 is based upon a "system on chip" (SoC) implementation that incorporates microcontroller hardware 222 with memory 223, input/output interfaces 229, and other features to perform the various signal processing and other actions of device control system 204. Various SoC and other integrated video processing implementations are available from Texas Instruments, Conexant Systems, NXP Semiconductor, Broadcom Inc., and many other suppliers as appropriate. Other embodiments may implement controller 221 and/or the other features of device control system 204 with any number of separate processing components, such as any number of separate chips that provide specific functions (e.g., decoding, demodulation, decryption, transcoding and/or the like), as well as any additional memories 223, input/output interfaces 229 and/or other features as desired.

Display processor module 225 includes any appropriate hardware, software and/or other logic to decode and/or transcode the received media content to a format that can be presented on interface 260. The content, including received/stored content and any other displays may then be presented to one or more interfaces 260 in any desired format. In various embodiments, display processor 225 produces an output signal encoded in any standard format (e.g., ITU656 format for standard definition television signals or any format for high definition television signals) that can be readily converted to standard and/or high definition television signals at interface 260 to produce output signal 280.

Various embodiments may allow device control system 204 to automatically or manually (e.g., in response to a viewer input) obtain additional information from a server or other system that is accessible via a network (such as the Internet) coupled to network interface 232. Network interface 232 operates using any implementation of protocols or other features to support communication over a network. In one embodiment, network interface 232 supports conventional LAN, WAN or other protocols (e.g., the TCP/IP or UDP/IP suite of protocols widely used on the Internet). Network interface 232 typically includes interface hardware such as LAN adapter hardware, a conventional network interface card (NIC), a USB-based WiFi interface, or the like provided within device control system 204.

Device control system 204 may include one or more direct connect interface(s) 235, such as any physical, logical and/or other features that can be used to interface with another consumer electronics device, external computer, mobile phone, storage medium or other device as appropriate. In various embodiments, direct connect interface 231 includes an interface to a Consumer Electronics Control (CEC) connection. CEC is a feature of HDMI that allows, for example, CEC-enabled devices to command and control each other without user intervention. Also or instead, direct connect interface(s) 231 may include one or more interfaces to other types of device communication connections or busses, including, but not limited to, a universal serial bus (USB), IEEE 1394 ("Firewire") or other standard wired interface that allows users to transfer data between device control system 204 and an external device over a cable or other physical connection via a source input 140. Other embodiments may additionally or alternately implement direct interface 231 with a device communication connection using a wireless receiver, transceiver or other module capable of wirelessly exchanging data. Examples of wireless direct connect interfaces 231 include conventional IEEE 802.15.4 ("ZIGBEE") or other wireless local area network (WLAN) transceivers, including transceivers that implement other wireless signaling techniques such as IEEE 802.15.1 ("BLUETOOTH"), IEEE 802.11 ("WI-FI") and/or the like. In various embodiments, one or more of such direct connect interface(s) 231 may also be used by remote control devices (e.g., remote control 112) to communicate with one or more devices which they control.

Programs for viewing or other processing may be selected in any manner. In many cases, device control system 204 selects a television program, movie, media stream or other programming in response to viewer inputs received via a remote control (such as remote control component 112) or other user interface as desired. Such viewer inputs may be received at input/output interfaces 229 via the remote control IR/RF interface 235, a direct connect interface 231 and/or elsewhere in response to viewer interaction with an on-screen display window In various embodiments, viewers are able to use an on-screen display to select programming from content input interface 226 (e.g., terrestrial, cable, DBS or other broadcast programming), from programs previously stored in DVR 107 via storage interface 227, from streaming video received via network interface 232, from a file server or storage device directly connected via direct connect interface 231, and/or from any other source input 140.

Display interface 260 comprises any physical and/or logical interface to a television or other display 102. Some types of device control systems 204 may incorporate a built-in display 102, such as the display in a laptop or other portable computer, a media player, a portable television and/or the like. In other embodiments wherein device control system 204 provides video output signals 280 to an external display 102, such signals 280 may be provided in any compatible format. In embodiments wherein display 102 is a conventional television, for example, display interface 260 may provide video and audio output signals in any conventional format, such as component video, S-video, HDMI, Digital Visual Interface (DVI), IEEE 1394, and/or any other formats as desired. In a particular embodiment, signals 280 are transferred in accordance with an HDMI interface.

HDMI is an audio/video interface for transmitting uncompressed digital data, and implements certain EIA/CEA-861 standards that define video formats and waveforms, transport of LPCM audio, and auxiliary data. In general, HDMI supports, on a single cable, uncompressed video, up to 8 channels of compressed or uncompressed digital audio, an HDMI Consumer Electronics Control (CEC) connection, and an Ethernet data connection. As used herein, the term "HDMI" refers to HDMI as defined in the current publicly available and any applicable future publicly available versions of the HDMI specification as may be appropriate to implement embodiments of the present disclosure. The current publicly available HDMI versions are hereby incorporated by reference.

In accordance with one embodiment, a particular consumer electronics device (e.g., receiving device 104) configures one or more other electronic devices (e.g., display 102) to accept remote control commands from the particular device's remote control using an HDMI CEC connection within the HDMI protocol. CEC is a type of a device communication and feature of HDMI that allows, for example CEC-enabled devices to communicate with each other and command and control each other without user intervention. As mentioned above, although the example provided herein uses the CEC connection within the HDMI protocol, any suitable device communication connection or bus may be used under any specification or protocol.

Figure 3:
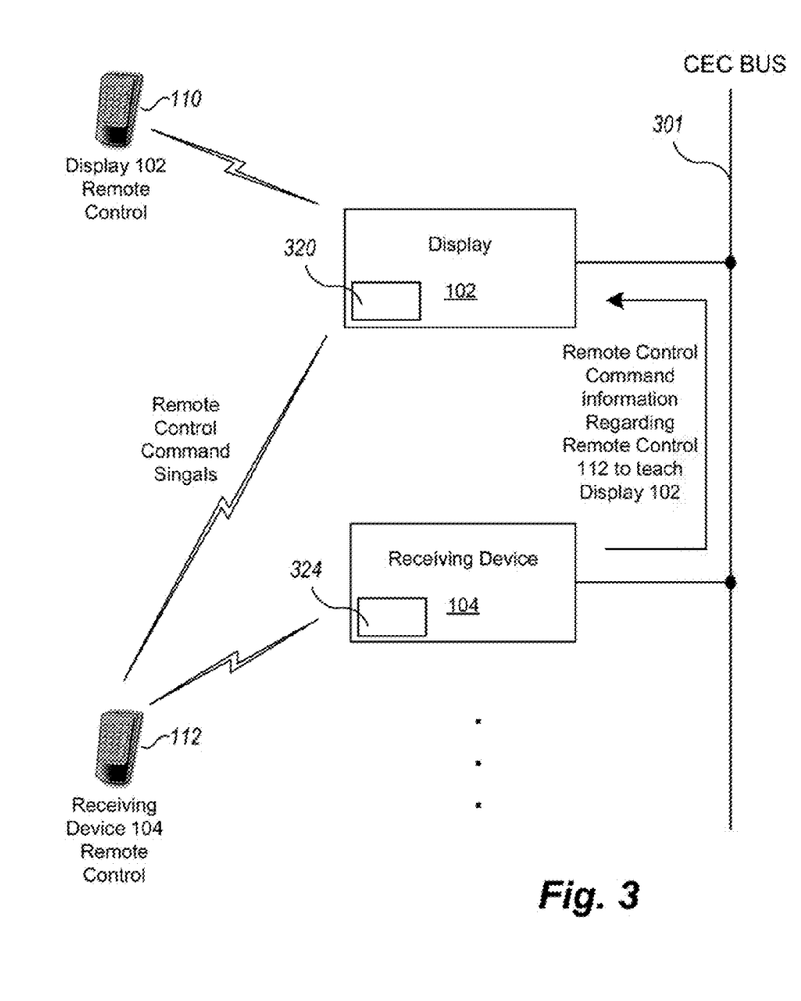
FIG. 3 is a block diagram of devices connected to a High-Definition Multimedia Interface (HDMI) Consumer Electronics Control (CEC), (also referred to hereinafter interchangeably as "CEC") bus in accordance with one embodiment.

Referring now to the conceptual block diagram shown in FIG. 3, one or more CEC-enabled devices are connected to a CEC bus 301 after, for example, the devices have been powered on and have performed a self-discovery procedure as specified by the relevant portion of the publicly available HDMI CEC specification (i.e., the "CEC specification" or "CEC standard"). In the example shown in FIG. 3, only display 102 and receiving device 104 are shown connected to CEO bus 301; however, additional devices may also be connected to bus 301, limited in one example embodiment only by the CEO specification implemented by the devices (e.g., ten or less devices in some versions of the specification). CEO bus 301 is a bidirectional serial bus using a standard AV link protocol. That is, CEO is effectively a one-wire "party line." While the present application discusses communication within the context of a CEO protocol, other electronics control protocols that allow inter-device communication and control may alternatively be utilized.

Receiving device 104 stores certain remote control command information 324 regarding how to interpret, process and execute commands received from remote control component 112 of receiving device 104 to control receiving device 104. Possible commands received from remote control 112 (and/or remote control 110) include any command for controlling a device. These commands include, but not limited to, commands regarding: powering on and off of the device, changing the channel up or down, changing the volume up or down and/or other audio controls, muting, letter and/or number keys or keyboards, content source input selection, content output selection, presenting and closing an electronic program guide, presenting and closing a user menu, presenting and closing a device menu, menu navigation controls, paging up or paging down, menu/item select controls, content playback controls such as play, pause, rewind, fast forward, etc.

In one embodiment, remote control 112 may be an IR remote control that sends out pulses of infrared light which may be received by the remote control interface 235 of receiving device 104. These pulses of infrared light represent specific binary remote control command codes. These binary remote control command codes correspond to particular commands to be performed by the receiving device 104 in response to receiving the particular binary remote control command code. After the remote control interface 235 decodes the pulses of light into the binary data that the processor 222 of the receiving device 104 can understand, the processor 222 then carries out the corresponding command on the receiving device 104 as applicable.

The information that tells the receiving device 104 which binary codes received from remote control 112 correspond to which device commands may be associated with a single device code representing all these particular code-to-command mappings for receiving device 104 (e.g., a device model and/or manufacturer command code). For example, such manufacturer command codes currently exist and continue to be publicly available (including the code-to-command mappings they represent) for many if not most consumer electronic devices that use remote control devices. The binary codes sent by remote control 112 may also include a device address, device code, the manufacturer command code as described above, or some other data that tells the receiving device 104 that the remote control signal received is intended for the receiving device 104 and thus, not to ignore it.

Some or all of the information that tells the receiving device 104 which pulses of infrared light represent specific binary codes; which binary codes correspond to which device commands; and the device address, device code, or manufacturer command code may be part of the remote control command information 324 stored on the receiving device 104. Remote control command information 324 may be stored in any suitable memory or storage component, such as memory 223 illustrated in FIG. 2. In various example embodiments, the remote control command information 324 is stored on the memory 223 or other storage of the receiving device 104 and/or is logically implemented in the remote control interface 235 and/or controller 221 of the receiving device 104 with appropriate embedded circuitry and/or firmware. Corresponding information as it applies to RF remote control commands may also be part of remote control command information 324 stored on the receiving device 104.

Similarly, display 102 is configured to store remote control command information 320 regarding how to interpret, process and execute commands received from remote control component 110 of display 102 to control display 102. For example, some or all of the information that tells the display 102 which pulses of infrared light represent specific binary codes; which binary codes correspond to which device commands for display 102; and the device address, device code, or manufacturer command code of display 102 may be part of the remote control command information 320 stored on the display 102.

Some or all of the remote control command information 324 of receiving device 324 may be communicated over the CEO bus 301 or other channel to the display 102 such that display 102 can use this information to receive, interpret and process signals received from remote 112 of receiving device 104 instead of or in addition to being able to process and execute commands from remote 110 of the display 102. In some embodiments, such remote control command information 320 need not be received from the receiving device 104, but may be received from any device that is able to communicate such information (including, in some embodiments, remote control 112). Which of the remote control command information 324 is communicated, how it is communicated, and how it is characterized by receiving device 104 to display 102 in order for display 102 to use it to receive, interpret and process signals received from remote control 112 of receiving device 104 may depend on the protocol used to communicate the remote control command information 324 to various devices (including display 102) and any other communication standards available to communicate remote control command information between devices.

For example, the CEO protocol set forth in the HDMI specification includes automatic mechanisms for physical address discovery, product-type-based logical addressing, arbitration, retransmission, broadcasting, and routing control. CEO-enabled devices (such as display 102 and receiving device 104), when interconnected via CEO bus 301, perform a self-discovery system and share certain information, such as device type and manufacturer. That is, each CEC-enabled device is at least partially aware of the capabilities of other CEC-enabled devices in the system.

CEO assumes that all entertainment devices in a system are directly or indirectly connected to a root display in a tree, where sources are considered "leaf" nodes. Accordingly, display 102 and receiving device 104 in FIG. 3 each have a corresponding physical address and logical address. During initialization, or "hot-plug", display 102 and receiving device 104 each obtain a physical address via the CEO protocol, which consists of four numbers indicating that device's place in the hierarchy relative to a "root" address of 0.0.0.0. For example, if display 102 is considered the "root", and receiving device 104 is attached to an input number 1 of display 102, then receiving device 104 will have a physical address of 1.0.0.0.

Display 102 and receiving device 104 will also obtain a logical address reflecting its product type by negotiating with each other via CEO bus 301. Further information regarding logical addresses can be found, for example, in the HDMI specification, and need not be described in detail herein. For the purposes of this example, it will be assumed that display 102 has a logical address of 0, and receiving device 104 has a logical address of 3.

In general, communication over CEO bus 301 is performed between an initiator and one or more followers. Initiator-asserted bits provide data, while follower-initiated bits provide acknowledgement. CEO messages are sent over CEO bus 301 using frames, where each frame consists of a start bit followed by header block and optional data blocks.

Figure 4:
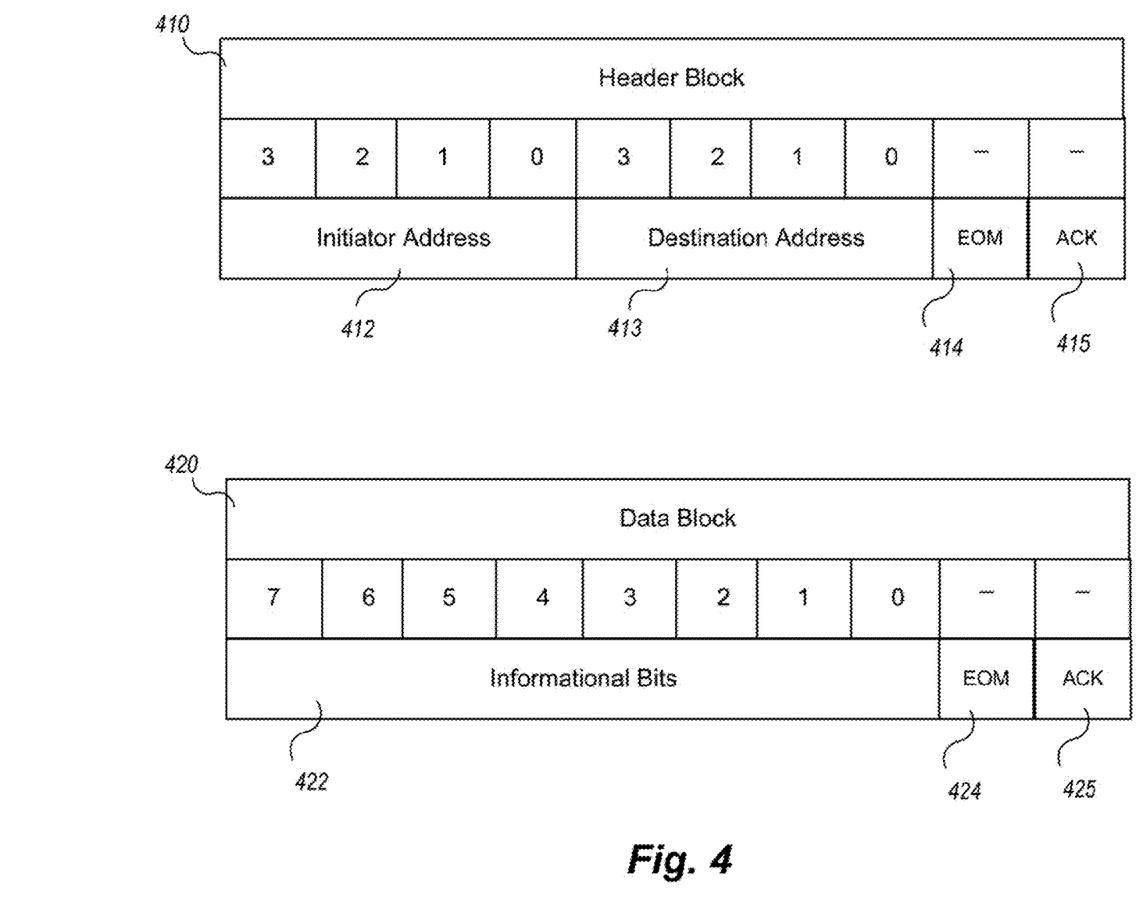
FIG. 4 is a diagram of an example structure of a CEC message according to one embodiment.

More particularly, as shown in FIG. 4, a CEO message generally consists of a ten-bit header block 410 followed by zero or more ten-bit data blocks 420. Header block includes a four bit initiator address 412 (containing a logical address) followed by a four bit destination address 413 (also containing a logical address). The block is terminated by an end-of-message (EOM) bit 414 followed by an acknowledge bit (ACK) 415. The EOM bit 414 signals the final block in a message. That is, a "0" indicates that one or more blocks follow, and a "1" indicates that the message is complete. When a single follower provides an ACK 415 to an initiator, it does so by overriding the output from the initiator (pulling bus 301 to a "0" while the initiator sends a "1").

Consider an example of communication from receiving device 104 to display 102 over CEC bus 301, in which receiving device 104 is considered the initiator, and display 102 is the follower. The message begins with a start bit, followed by a header block 410 containing an initiator address 412 of "0011" (logical address 3 of receiving device 104) and a destination address 413 of "0000" (logical address 0 of display 102). This is followed by an EOM bit 414 of "0" and an ACK 415 of "0". The subsequent data blocks 420 would then include eight information bits (422) (generally, an operational code ("opcode") and any necessary parameters). Each 10-bit data block 420, except the final one, will have an EOM bit 424 set to '0'. Each data block 420 sent by receiving device 104 will have its ACK bit 425 "overridden" by display 102. If any block in a frame is not acknowledged, initiators will sense the condition and may retransmit a predetermined number of times (e.g., 5 times).

In accordance with one embodiment of the present disclosure, CEC messages are sent from one device (the "teaching device", e.g., receiving device 104) to another device (the "learning device", e.g., the display 102) to facilitate the learning device to be able to accept and execute commands from a remote control of the teaching device. To accomplish this, specific messages (generally, predetermined "opcodes" followed by one or more parameters) are incorporated into one or more data blocks 420 and transmitted between the CEC-enabled devices. For example, one or more of these opcodes may tell the learning device the meaning of, to assimilate, and/or how to assimilate the remote control command information of the teaching device communicated via one or more opcode parameters.

For example, remote control command information 324 from receiving device 104 (and perhaps from other devices) may be automatically stored, aggregated, assimilated and/or programmed into memory (i.e., "learned") by display 102 along with any existing remote control command information 320 of display 102 such that when display 102 receives a signal from remote control 112 of receiving device 104, it can also recognize the remote control command codes represented by that signal, cross reference the code communicated by the signal with an equivalent corresponding command that the display 102 may execute, and then execute the corresponding command. In accordance with one embodiment, a standardized set of opcodes ("remote control command learning opcodes") may be implemented and used in multiple entertainment devices available from multiple vendors. That is, multiple vendors may agree a priori (e.g., by establishing a standard) to utilize a particular set of opcodes to accomplish sending the remote control command information from one device to another to facilitate the learning of the remote control command by the other device. In another embodiment, vendors use different vendor-specific opcodes for the communication of remote control command information, but those opcodes may be known by the learning device. In one embodiment, a remote control command learning message sent over bus 301 may include a standard remote control command learning opcode that is associated with and understood by devices from multiple manufacturers and include relevant remote control command information as parameters. Alternatively, the remote control command information message may include a vendor-specific remote control command learning opcode that is known, pre-programmed, or otherwise previously learned by the device to which the remote control command information is being sent.

In an exemplary embodiment, the remote control command learning opcodes and parameters may include four opcodes: (1) an opcode broadcasting a request that remote control command information be sent to the sender from available devices (2) an opcode broadcasting the remote control command information from the sender to all available devices, (3) an opcode requesting that remote control command information be sent from a specific device, and (4) an opcode to send remote control command information to a specific device. In various embodiments, the opcodes might be accompanied by and/or implemented with standard CEO commands that can communicate such information or be customized to communicate such information.

Opcode 1 would generally be transmitted by the learning device (e.g., display 102) during startup, upon connecting to a network or bus (e.g., bus 301), after reset, when the learning device determines that its aggregated remote control command information (e.g., remote control command information 320) is not up-to-date, and/or in response, for example, to a request by the user or some other source. Determining whether or not the aggregated remote control command information is up-to-date may be achieved in a variety of ways known in the art, for example, by comparing check-sums of the aggregated remote control command information to the corresponding check-sum of remote control command information available from the devices from which remote control command information is being received.

Opcode1 may initiate aggregation in the "background." That is, it is advantageous in some cases for the aggregation and learning of remote control command information to occur in a way that is transparent to the user and does not deleteriously affect (i.e., slow down) other operations (such as viewing of content) that might be taking place simultaneously.

Opcode2, may be transmitted by the teaching device (e.g., receiving device 104) during startup, upon connecting to a network or bus (e.g., bus 301), after reset, and/or in response, for example, to a request by the user or some other source. That is, the user may request, through the use of the teaching device and/or a remote control of the teaching device, that remote control command information from the teaching device be communicated to all available connected devices (e.g., those on bus 301). Opcode2 may also initiate aggregation in the "background."

Thus, in one embodiment, when a device initiates or connects to bus 301, it will broadcast, via opcode 1, the remote control command information of that device to multiple devices (or all other devices) on the network or bus such that the other devices will be able to understand and execute commands received from the remote control device of the device. The device may also broadcast, via opcode 2, a request for the remote control command information from all available devices on the network or bus such that the device will be able to understand and execute commands received from the remote control devices of the other devices on the network or bus (e.g., bus 301).

Opcode 3 may be initiated by a learning device and sent to a specific teaching device when the learning device becomes aware that the aggregated remote control command information on the learning device may not be up-to-date with the remote control command information of a specific device.

Opcode 4 may be initiated by a teaching device and sent to a specific learning device in response to receiving opcode 1 or opcode 3 from the specific learning device requesting remote control command information. Thus, opcode 4 is used by a device responding to a request from the learning device (e.g., a request in the form of opcode1 or opcode3). Opcode 4 is thus used to transfer remote control command information over CEO bus 301 using a parameter or parameters that include all or part of the remote control command information for that teaching device.

Referring again to the simplified device topology shown in FIG. 3, a typical remote control command information aggregation and learning process, in the context of HDMI, might proceed as follows. First, display 102 and receiving device 104 (assumed to be CEO-enabled devices) engage in a self discovery process in which logical and physical addresses are assigned to each device. Further, one device is designated as the "learning device," based either on the logical address of the device, which device first connected to the bus 301, or user preference (i.e., a user may set one device to be the learning device). For the purpose of this example, it will be assumed that display 102 is the learning device, and that remote control command information 320 includes only the existing remote control command information of only remote 110 of display 102.

Next, the learning device (display 102) sends a message (e.g., opcode1) over CEO bus 301 requesting remote control command information from other CEO-enabled devices. Opcode1 may be parameterless or optionally followed by one or more parameters, as discussed above. One such parameter may be a request for specific remote control command information or a specific type of remote control command information. One such parameter may be the device code or manufacturer command code of the display 102 identifying what commands are available to be executed by display 102 and perhaps in what format the command names should be sent. For example, display 102 may not have any need for remote control command information useful for determining how to process a set of remote control commands associated with playing or pausing content if the display 102 has no ability to do so. Also, the remote control command names or labels as understood by display 102 may have completely or slightly different names for the same or similar function that may be executed on the receiving device 104. Thus one parameter may be for the display 102 to send, as part of the request, the device code or manufacturer command code which may represent or indicate what the specific command names or labels are for specific device functions as understood by the display 102. In response to this and/or other accessible information, the teaching device (e.g., receiving device 104) may then provide the remote control command information in the appropriate format that may be understood by the display 102 according to the display manufacturer command code and/or other accessible information.

Opcode 1 is sent in accordance with the CEO protocol as shown in FIG. 4. That is, after a start bit, the initiator address 412 of header block 410 is set to the logical address of display 102, the destination address 413 is designated such that the message is broadcast to other devices on the bus, as provided by the CEO standard, and the EOM bit 414 is set to "0". Data block 420 is then used to transmit various parameters, if appropriate, wherein the EOM bit 424 of the last data block is set to "1".

Upon receiving the opcode 1 message, receiving device 104 accesses its remote control command information 324 and sends it to display 102 using opcode 4 followed by the remote control command information itself via opcode 4 parameters. More particularly, a header block 410 includes an initiator address 412 corresponding to the logical address of receiving device 104, a destination address 413 corresponding to the logical address of display 102, followed by a plurality of data blocks 420 containing all or a portion of the remote control command information 324 (as determined by any parameters sent by display 102).

For example, the parameters of opcode 4 may include one or more parameters designating and including the information that tells the display 102 which pulses of infrared light represent specific binary codes for the remote control 112 of the receiving device; one or more parameters designating and including information indicating to display 102 which binary codes from remote control 112 correspond to which commands or which type of commands of receiving device 104; and/or one or more parameters designating and including information indicating the device code, or manufacturer command code of the receiving device 102. In some embodiments, if the display 102 does not recognize the raw data from receiving device 104 indicating the particular commands or types of commands of receiving device 104 to which the codes of remote 112 of the receiving device correspond, or they are not communicated in a standardized manner, then the display 102 may be able to use the device code or manufacturer command code of the receiving device 104 to cross reference, interpret and/or translate the command names received from the receiving device 104.

For example, the manufacturer command codes for various devices may have already been pre-programmed into or stored on the display 102, and these manufacturer command codes correspond to particular stored data or information programmed into the display, or may lead the display 102 to find such data, indicating which remote control binary codes of the received remote control data from the receiver 104 correspond to which functions of the remote control 110 of the display 102 and/or functions of the display 102 itself. This enables the display 102 to cross reference such labels or names of particular commands of receiving device 104 with corresponding commands or functions of display 102 in order to execute such commands corresponding to the binary codes received from the remote control device 112 of the receiving device 104.

Also, in some embodiments, only the device code or manufacturer command code need be sent by the teaching device to the learning device if such a code and/or the data mapping the remote control binary commands data to the specific device commands indicated by the device code or manufacturer command code is already stored by the learning device. In such a case, the teaching device (e.g., receiving device 104) sends the device code or manufacturer command code of the teaching device to alert the learning device (e.g., display 102) to listen for and execute to the extent possible any remote control commands corresponding to that device code or manufacturer command code in a manner indicated by the data mapping the remote control binary commands data to the specific device commands already stored or otherwise accessible to the learning device.

After acknowledging each portion of the received remote control command information, display 102 suitably stores the received information as part of or along with the existing remote control command information 320 of the display 102 where it can be accessed for a variety of purposes including to control the display using the remote control 112 of the receiving device and/or other connected devices via the CEO bus. In some embodiments, the display may also or instead update and/or reprogram as applicable any firmware in which the remote control command information 320 is stored and/or programmed.

In various embodiments, the teaching device may send data (e.g., via a parameter of opcode 2 and/or opcode 4) to the learning device indicating a particular command name, label or identifier associated with a particular remote control command code of the remote control of the teaching device corresponding to an equivalent standard known CEO command name and/or associated command parameters that perform the same or equivalent function when sent to a device on the CEO bus 301. For example, the command name or identifier to increase the system audio used by the receiving device 104 and the associated binary remote control command of remote 112 of the receiving device may be sent to the display 102 along with data associating the command name or identifier and/or the associated binary remote control command with the known CEO command for increasing system volume. This data may be sent within a CEO message (e.g., in an opcode 2 message with applicable parameters). When the display 102 receives the message, it will then be able to associate the binary remote control command to increase system volume when it is received from remote 112 of the receiving device with the corresponding command to increase system volume to execute on the display by using the known received CEO command name or identifier as a common reference.

Having now been configured by the receiving device 104 to accept and execute remote control commands from the remote control 112 of the receiving device 104 as described above, the display 102 receives a remote control command from the remote control 112 of the receiving device 104 which includes the address, device code, manufacturer code or other identifier of the receiving device 104 and recognizes that address or device code. The display 102 recognizes that address or device code by checking whether the address or device code matches or otherwise corresponds to any such address or device codes received from any devices that previously sent any stored remote control command information to the display 102. When the display 102 recognizes that the address or device code is associated with the stored remote control command information previously received from the receiving device 104, the display uses the associated stored remote control command to cross reference the remote control command associated with the command code received from the remote control 112 with the same or corresponding device command applicable to the display 102. The display 102 then executes the corresponding command on the display 102. It will be appreciated that any device shown in customer premises 125 may be the "teaching device" and any other device may be the "learning device" as described herein at any applicable time.

Figure 5:
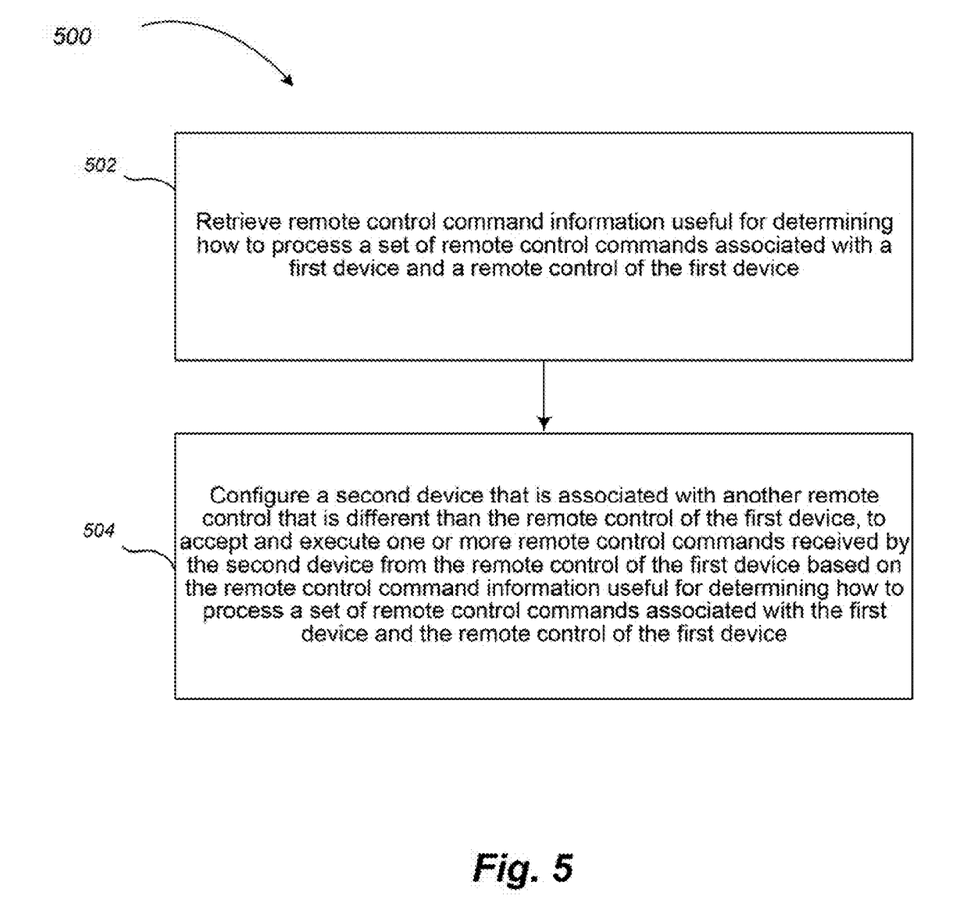
FIG. 5 is a flowchart illustrating a process for configuring devices to accept and process remote control commands received from remote controls of other devices in accordance with one embodiment.
Figure 6:
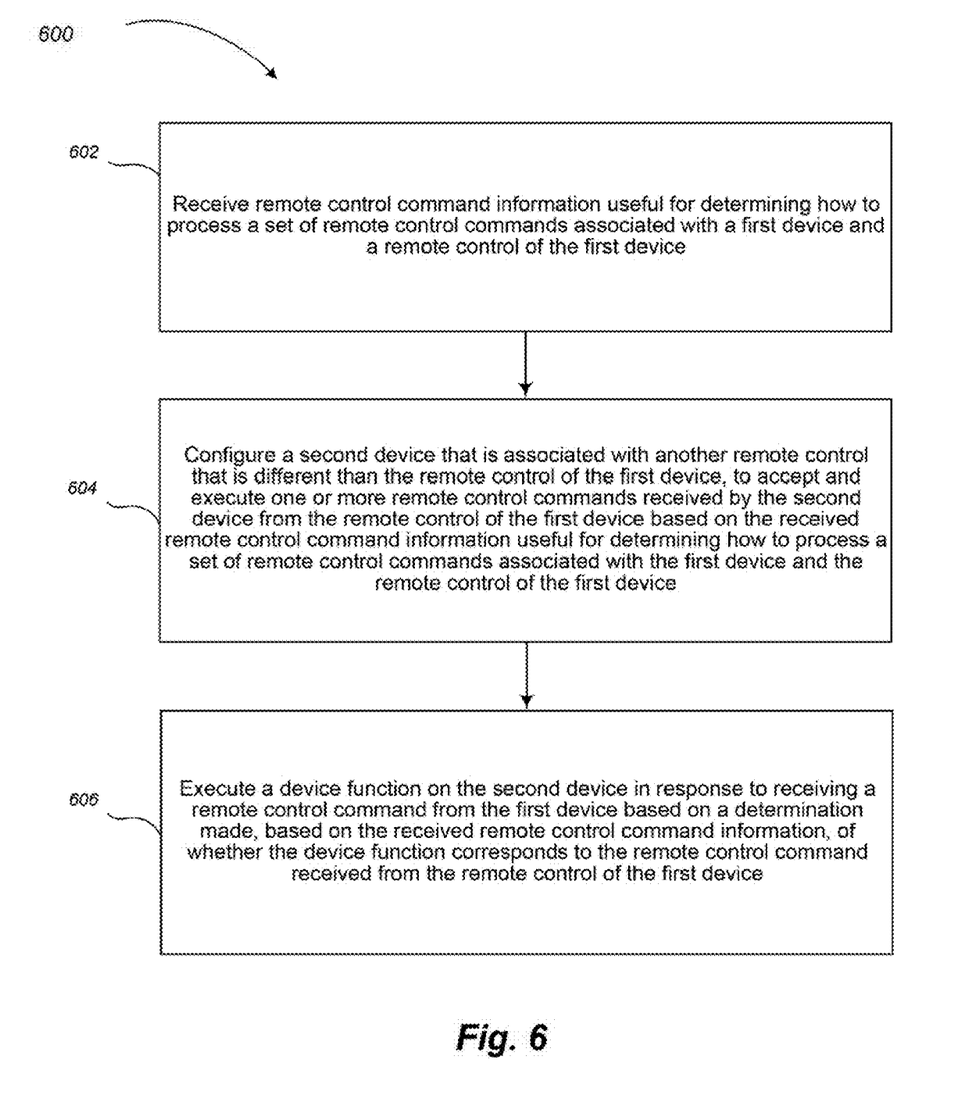
FIG. 6 is a flowchart illustrating a process for processing and executing remote control commands received from remote controls of other devices in accordance with one embodiment.
Figure 7:
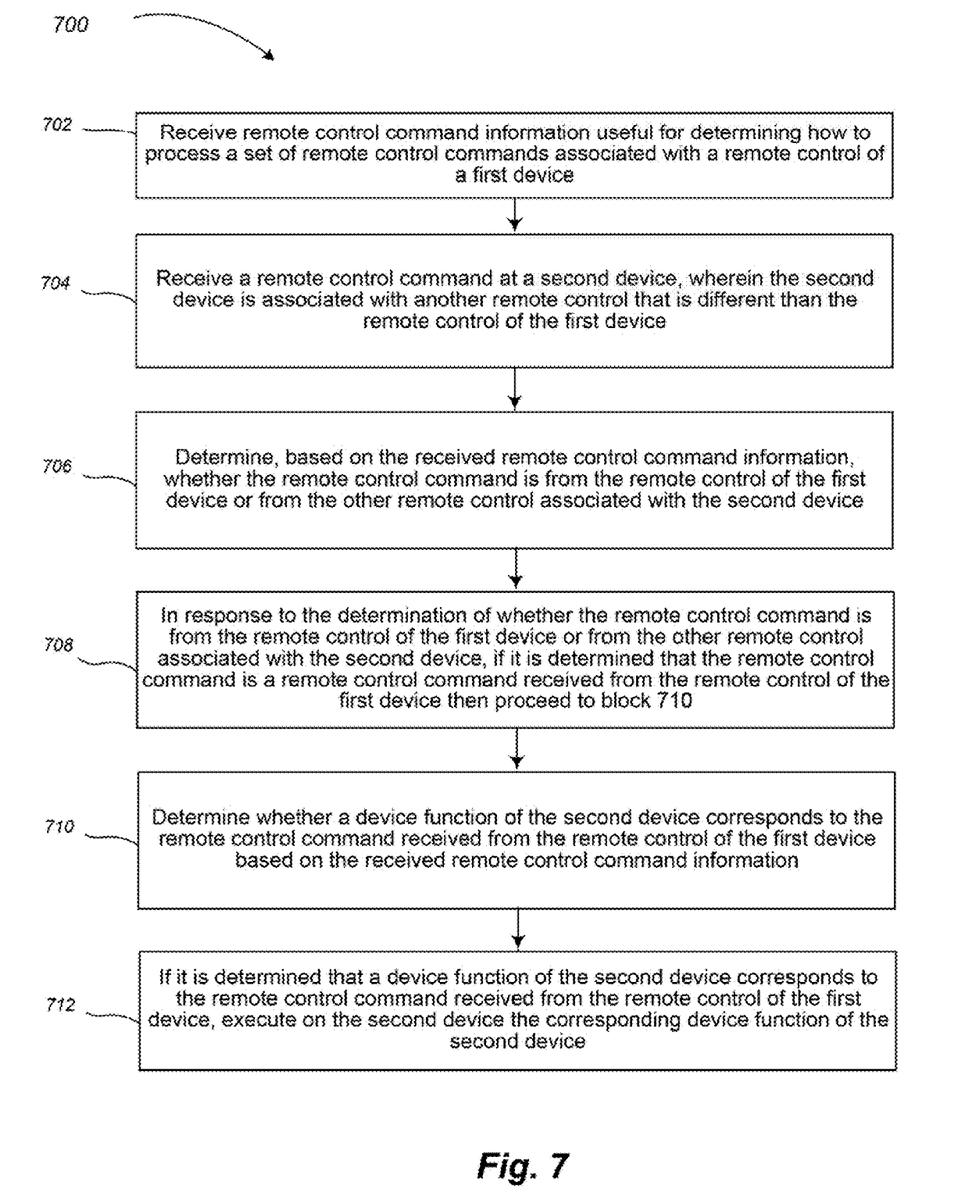
FIG. 7 is a flowchart illustrating a process for configuring devices to accept remote control commands and for executing remote control commands received from remote controls of other devices in accordance with one embodiment.

Referring now to FIGS. 5, 6 and 7, each is a flowchart illustrating a process according to various example embodiments. Each described process, function, act or step of FIGS. 5, 6 and 7 may represent one or more of a module, segment, or portion of code, which comprises one or more executable instructions for implementing the specified logical function(s). It should also be noted that in some implementations, the functions noted in the process may occur in a different order, may include additional functions, may occur concurrently, may be omitted and/or may be performed by any hardware, software and/or firmware logic stored in any tangible storage medium within device control system 204 or other suitable electronic system.

FIG. 5 is a flowchart illustrating a process 500 for configuring devices to accept and process remote control commands received from remote controls of other devices in accordance with one embodiment.

At 502, the system for configuring devices to accept remote control commands retrieves remote control command information useful for determining how to process a set of remote control commands associated with a first device and a remote control of the first device.

At 504 the system for configuring devices to accept remote control commands configures a second device that is associated with another remote control that is different than the remote control of the first device, to accept and execute one or more remote control commands received by the second device from the remote control of the first device based on the remote control command information.

FIG. 6 is a flowchart illustrating a process 600 for processing and executing remote control commands received from remote controls of other devices in accordance with one embodiment.

At 602, the system for configuring devices to accept remote control commands receives remote control command information useful for determining how to process a set of remote control commands associated with a first device and a remote control of the first device.

At 604 the system for configuring devices to accept remote control commands configures a second device that is associated with another remote control that is different than the remote control of the first device, to accept and execute one or more remote control commands received by the second device from the remote control of the first device. This is based on the received remote control command information useful for determining how to process a set of remote control commands associated with the first device and the remote control of the first device.

At 606 the system for configuring devices to accept remote control commands executes a device function on the second device in response to receiving a remote control command from the first device based on a determination made, based on the received remote control command information, of whether the device function corresponds to the remote control command received from the remote control of the first device.

FIG. 7 is a flowchart illustrating a process 700 for configuring devices to accept remote control commands and for executing remote control commands received from remote controls of other devices in accordance with one embodiment.

At 702, the system for configuring devices to accept remote control commands receives remote control command information useful for determining how to process a set of remote control commands associated with a remote control of a first device.

At 704 the system for configuring devices to accept remote control commands receives a remote control command at a second device, wherein the second device is associated with another remote control that is different than the remote control of the first device.

At 706 the system for configuring devices to accept remote control commands determines, based on the received remote control command information, whether the remote control command is from the remote control of the first device or from the other remote control associated with the second device.

At 708 the system for configuring devices to accept remote control commands, in response to the determination of whether the remote control command is from the remote control of the first device or from the other remote control associated with the second device, if it is determined that the remote control command is a remote control command received from the remote control of the first device, then proceeds to block 710.

At 710 the system for configuring devices to accept remote control commands determines whether a device function of the second device corresponds to the remote control command received from the remote control of the first device based on the received remote control command information.

At 712 the system for configuring devices to accept remote control commands, if it is determined that a device function of the second device corresponds to the remote control command received from the remote control of the first device, executes on the second device the corresponding device function of the second device.

The various functions, methods, and other features described herein may be performed by any hardware, software and/or firmware logic stored in any non-transitory tangible storage medium within device control system 204, including any sort of optical, magnetic or other storage hardware. In some embodiments, its various functions are implemented using software or firmware logic that is stored within a flash memory or ROM (e.g, memory 223) and executed by controller 221 executing on SoC 266, processor 222 and/or other processing hardware within device control system 204. Other embodiments, however, will execute one or more functions on other processing servers, circuits or other logic located external to device control system 204.

While several exemplary embodiments have been presented in the foregoing detailed description, it should be appreciated that a vast number of alternate but equivalent variations exist, and the examples presented herein are not intended to limit the scope, applicability, or configuration of any embodiment in any way. To the contrary, various changes may be made in the function and arrangement of elements described without departing from the scope of the claims and their legal equivalents.

The term "exemplary" is used herein to represent one example, instance or illustration that may have any number of alternates. Any implementation described herein as exemplary is not necessarily to be construed as preferred or advantageous over other implementations.

The invention claimed is:

1. A method in a system for configuring devices to accept remote control commands, comprising:
retrieving, by the system for configuring devices to accept remote control commands, remote control command information useful for determining how to process a set of remote control commands associated with a first device and a remote control of the first device, wherein the retrieving the remote control command information useful for determining how to process a set of remote control commands associated with the first device and the remote control of the first device includes:
the first device retrieving the remote control command information on the first device;
the first device determining, at least in part by evaluating existing firmware programming of the first device, values of data representing the remote control command information, and
preparing the data representing the remote control command information for communication of the data to the second device; and
configuring, by the system for configuring devices to accept remote control commands, a second device that is associated with another remote control that is different than the remote control of the first device, to accept and execute one or more remote control commands received by the second device from the remote control of the first device based on the remote control command information useful for determining how to process a set of remote control commands associated with the first device and the remote control of the first device, wherein the configuring includes the first device communicating to the second device, over a communications network, the remote control command information useful for determining, how to process a set of remote control commands associated with the first device and the remote control of the first device.

2. The method of claim 1 wherein the communications network is a device communication bus between consumer electronics devices.

3. The method of claim 2 wherein the communicating over a communications network includes communicating to the second device the remote control command information useful for determining how to process a set of remote control commands associated with the first device and the remote control of the first device using a device-to-device messaging protocol.

4. The method of claim 3 wherein the device-to-device messaging protocol is based on a High Definition Multimedia Interface (HDMI) Consumer Electronics Control (CEC) bus standard.

5. A method in a system for configuring devices to accept remote control commands, comprising:
retrieving, by the system for configuring devices to accept remote control commands, remote control command information useful for determining how to process a set of remote control commands associated with a first device and a remote control of the first device, wherein the retrieving the remote control command information useful for determining how to process a set of remote control commands associated with the first device and the remote control of the first device includes the first device retrieving the remote control command information on the first device; and
configuring, by the system for configuring devices to accept remote control commands, a second device that is associated with another remote control that is different than the remote control of the first device, to accept and execute one or more remote control commands received by the second device from the remote control of the first device based on the remote control command information useful for determining how to process a set of remote control commands associated with the first device and the remote control of the first device, wherein the configuring includes the first device communicating to the second device, over a communications network, using a device-to-device messaging protocol, the remote control command information useful for determining how to process a set of remote control commands associated with the first device and the remote control of the first device, wherein the communications network is a device communication bus between consumer electronics devices, wherein the communicating to the second device the remote control command information useful for determining how to process a set of remote control commands associated with the first device and the remote control of the first device using a device-to-device messaging protocol includes sending on the device communication bus a broadcast message from the first device to other devices on the device communication bus, the broadcast message including at least some of the remote control command information useful for determining how to process a set of remote control commands associated with the first device and the remote control of the first device, to facilitate the configuring of the second device to accept and execute one or more remote control commands received by the second device from the remote control of the first device.

6. A method in a system for configuring devices to accept remote control commands, comprising:
retrieving, by the system for configuring devices to accept remote control commands, remote control command information useful for determining how to process a set of remote control commands associated with a first device and a remote control of the first device, wherein the retrieving the remote control command information useful for determining how to process a set of remote control commands associated with the first device and the remote control of the first device includes the first device retrieving the remote control command information on the first device; and
configuring, by the system for configuring devices to accept remote control commands, a second device that is associated with another remote control that is different than the remote control of the first device, to accept and execute one or more remote control commands received by the second device from the remote control of the first device based on the remote control command information useful for determining how to process a set of remote control commands associated with the first device and the remote control of the first device, wherein the configuring includes the first device communication to the second device, over a communications network, using a device-to-device messaging protocol, the remote control command information useful for determining how to process a set of remote control commands associated with the first device and the remote control of the first device, wherein the communications network is a device communication bus between consumer electronics devices, wherein the communicating to the second device the remote control command information useful for determining how to process a set of remote control commands associated with the first device and the remote control of the first device using a device-to-device messaging protocol includes, in response to a request from the second device, sending on the device communication bus, a message from the first device addressed to the second device including at least some of the remote control command information useful for determining how to process a set of remote control commands associated with the first device and the remote control of the first device, to facilitate the configuring of the second device to accept and execute one or more remote control commands received by the second device from the remote control of the first device.

7. The method of claim 1 wherein the communications network includes at least a local area network, a wide area network, or the Internet.

8. The method of claim 1 wherein the remote control command information includes information regarding one or more of how to interpret, identify or execute remote control commands received from the remote control of the first device.

9. The method of claim 1 wherein the remote control command information includes information regarding one or more of: which pulses of infrared light represent specific command codes of the remote control of the first device; which radio frequency signals represent specific command codes of the remote control of the first device of the receiving device; which command codes of the remote control of the first device correspond to which device functions of the first device; which command codes of the remote control of the first device correspond to which device functions of the second device; a device code of the first device; a manufacturer command code of the first device indicative of remote control commands the first device can accept; a manufacturer command code of the first device indicative of remote control signals the first device can accept.

10. The method of claim 1 wherein the remote control command information includes information regarding which various command codes of the remote control of the first device correspond to which device functions of the first device and which various device functions of the first device correspond to various specific remote control commands of a command protocol of a device communication bus that is the communications network.

11. A system for configuring devices to accept remote control commands, comprising:
at least one processor; and
at least one memory area coupled to the at least one processor, wherein the at least one processor is configured to:
retrieve remote control command information useful for determining how to process a set of remote control commands associated with a first device and a remote control of the first device, wherein the retrieval of the remote control command information useful for determining how to process a set of remote control commands associated with the first device and the remote control of the first device includes:
retrieval of the remote control command information on the first device;
determination by the first device, at least in part by evaluation of existing firmware programming of the first device, of values of data representing the remote control command information; and
preparation of the data representing the remote control command information for communication of the data to the second device;
configure a second device that is associated with another remote control that is different than the remote control of the first device, to accept and execute one or more remote control commands received by the second device from the remote control of the first device based on the received remote control command information useful for determining how to process a set of remote control commands associated with the first device and the remote control of the first device, wherein the configuration of the second device includes communication by first device to the second device, over a communications network, the remote control command information useful for determining how to process a set of remote control commands associated with the first device and the remote control of the first device; and
execute a device function on the second device in response to receiving a remote control command from the first device based on a determination made, based on the received remote control command information, of whether the device function corresponds to the remote control command received from the remote control of the first device.

12. A non-transitory computer readable medium having computer executable instructions thereon that, when executed by a computer processor, cause the computer processor to:
receive remote control command information useful for determining how to process a set of remote control commands associated with a remote control of a first device;
receive a remote control command at a second device, wherein the second device is associated with another remote control that is different than the remote control of the first device;
determine, based on the received remote control command information, whether the remote control command is from the remote control of the first device or from the other remote control associated with the second device; and
in response to the determination of whether the remote control command is from the remote control of the first device or from the other remote control associated with the second device, if it is determined that the remote control command is a remote control command received from the remote control of the first device, then:
determine whether a device function of the second device corresponds to the remote control command received from the remote control of the first device based on the received remote control command information useful for determining how to process the set of remote control commands associated with the remote control of the first device;
if it is determined that a device function of the second device corresponds to the remote control command received from the remote control of the first device, execute on the second device the corresponding device function of the second device; and if it is determined that no device function of the second device corresponds to the received remote control command, then send a request over a communications network to one or more devices on the communications network for remote control command information useful for determining how to process remote control commands associated with one or more corresponding remote controls of the one or more devices on the communications network.

13. The non-transitory computer readable medium of claim 12 wherein the executable instructions, when executed by the computer processor, further cause the computer processor to:

receive remote control command information useful for determining how to process sets of remote control commands each associated with one or more additional devices and corresponding remote controls of the one or more additional devices; and determine whether the received remote control command is from the remote control of the first device, the other remote control associated with the second device, or one of the corresponding remote controls of the one or more additional devices based on at least some of: the received remote control command information useful for determining how to process the set of remote control commands associated with the remote control of the first device; or the received remote control command information useful for determining how to process sets of remote control commands that are each associated with the one or more additional devices and the corresponding remote controls of the one or more additional devices; and execute the remote control command on the second device based on the determination of whether the remote control command is from the remote control of the first device, the other remote control associated with the second device, or one of the corresponding remote controls of the one or more additional devices, and based on at least some corresponding remote control command information of: the received remote control command information useful for determining how to process the set of remote control commands associated with the remote control of the first device; and the received remote control command information useful for determining how to process sets of remote control commands that are each associated with the one or more additional devices and the corresponding remote controls of the one or more additional devices.

14. The non-transitory computer readable medium of claim 12 wherein the communications network is a communications bus between remotely controlled electronic devices.

* * * * *